(12) United States Patent
Condon

(10) Patent No.: US 8,095,962 B2
(45) Date of Patent: Jan. 10, 2012

(54) METHOD AND SYSTEM OF AUDITING DATABASES FOR SECURITY COMPLIANCE

(75) Inventor: Kirk Condon, Webster Groves, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1363 days.

(21) Appl. No.: 11/060,332

(22) Filed: Feb. 17, 2005

(65) Prior Publication Data

US 2006/0184996 A1 Aug. 17, 2006

(51) Int. Cl.
*G06F 7/04* (2006.01)
*G06F 17/30* (2006.01)

(52) U.S. Cl. .................. 726/2; 726/1; 726/27; 380/247; 380/248; 380/249; 380/250; 713/107; 713/125

(58) Field of Classification Search .................. 726/2, 1, 726/27; 380/247–250; 713/155–159
See application file for complete search history.

(56) References Cited

U.S. PATENT DOCUMENTS

| | | | |
|---|---|---|---|
| 5,842,212 A | 11/1998 | Ballurio et al. | |
| 6,005,571 A | 12/1999 | Pachauri | |
| 6,678,826 B1 | 1/2004 | Kelly et al. | |
| 6,820,082 B1 | 11/2004 | Cook et al. | |
| 6,915,265 B1 * | 7/2005 | Johnson | 705/2 |
| 2001/0023486 A1 * | 9/2001 | Kayashima et al. | 713/200 |
| 2003/0009434 A1 | 1/2003 | Munn et al. | |
| 2003/0065942 A1 * | 4/2003 | Lineman et al. | 713/201 |
| 2003/0069983 A1 * | 4/2003 | Mukund | 709/229 |
| 2004/0015701 A1 | 1/2004 | Flyntz | |
| 2004/0044655 A1 | 3/2004 | Cotner et al. | |
| 2005/0097149 A1 * | 5/2005 | Vaitzblit et al. | 707/202 |
| 2005/0160031 A1 * | 7/2005 | Hendrickson | 705/37 |
| 2006/0156379 A1 * | 7/2006 | Vissapragada | 726/1 |

* cited by examiner

*Primary Examiner* — Farid Homayounmehr
(74) *Attorney, Agent, or Firm* — Brooks Kushman P.C.

(57) ABSTRACT

Method and system of auditing databases for security compliance. The method and system relating to querying databases for security parameters and auditing the queried parameters against authorized security parameters to determine security compliance of the databases.

11 Claims, 1 Drawing Sheet

METHOD AND SYSTEM OF AUDITING DATABASES FOR SECURITY COMPLIANCE

BACKGROUND OF THE INVENTION

1. Field of the Invention

The present invention relates to methods and systems of auditing databases for security compliance.

2. Background Art

Companies and other entities may have a number of remotely located databases in which information is stored. In operation, one or more systems associated with the company may access one or more of the databases in order to perform various operations, such as to check billing issues, review transaction histories, or perform other operations which require data retrieval.

An important issue for such companies is database security compliance. Database security compliance relates to the various security parameters associated with the databases and whether the security parameters meet the security policies of the company. Because local database administrators (DBAs) may intentionally or accidentally change or manipulate the security parameters of the database they are responsible for operating, there exists a need to audit the security compliance of the databases so that company management or other individuals may assess the security of the databases without leaving such security solely to DBAs.

DETAILED DESCRIPTION OF THE PREFERRED EMBODIMENT(S)

Figure 1:
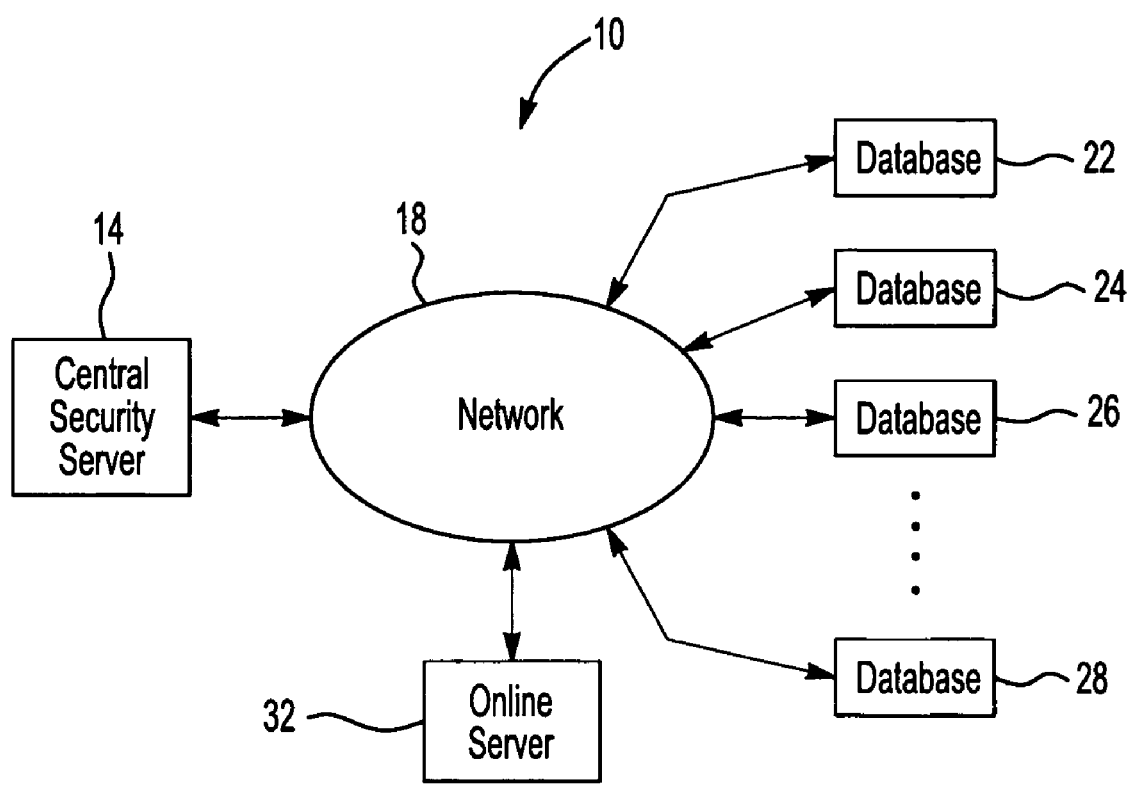
FIG. 1 illustrates a system in accordance with one non-limiting aspect of the present invention.

One aspect of the present invention relates to a method of auditing databases for security compliance. The method may include querying databases for database security parameters; determining authorized database security parameters for each queried database security parameter; auditing the queried database security parameters for compliance with the authorized security parameters; and compiling a security report of databases having noncompliant security parameters, the databases having noncompliant security parameters if the database security parameters associated therewith fail to comply with the authorized security parameters.

The method may include querying the databases with signals emitted from a central security server and auditing the queried data at the central security server so as to centralize database auditing. In particular, the method may include auditing the databases in a batch operation wherein multiple databases are queried with signals emitted from the central security server.

The method may include automatically auditing one or more databases as a function of auditing triggers, such as as a function of time dependent or user dependent triggers.

The method may include compiling the security report at an online server. The online server may include any number of features and configurations, including a menu accessible through the online server for determining the security parameters for auditing.

One non-limiting aspect of the present invention relates to a system for auditing databases for security compliance. The system may include a central security server in communication with the databases and configured for querying the databases for database security parameters and auditing the queried database security parameters for compliance with authorized security parameters associated therewith, and an online server in communication with the central security server and configured for compiling a security report of databases having noncompliant security parameters, the databases having noncompliant security parameters if the database security parameters associated therewith fail to comply with the authorized security parameters.

The above features and advantages, along with other features and advantages of the present invention, are readily apparent from the following detailed description of the invention when taken in connection with the accompanying drawings.

FIG. 1 illustrates a system 10 in accordance with one non-limiting aspect of the present invention. The system 10 includes a central security server 14, a network 18, and a number of databases 22-28. The system 10 generally relates to a distributed environment of databases associated with a common entity such that the entity is responsible for security of each database 22-28.

The databases 22-28 may be relational, hierarchical, object-orientated, or other types of databases configured to store data. The databases 22-28 may include on-site processors, logic, software, and other features for supporting access to the data stored therein. In general, data on the databases 22-28 is accessed by connecting to the databases and executing data query operations, such as through Structured Query Language (SQL) commands.

Database operation and access may be limited according to security parameters associated therewith. The databases 22-28 may include security parameters associated with accessing the database 22-28, such as security parameters requiring a user ID and password in order to access the database 22-28. The databases 22-28 may include security parameters relating to database operation, such as user privileges for updating and manipulating data or administrative privileges for adding, deleting, or otherwise manipulating user IDs, passwords, and privileges, and any number of other security parameters. Of course, the present invention contemplates the databases 22-28 having any number of security parameters and is not intended to be limited to the foregoing.

One particular aspect of database security relates to auditing security parameters associated with providing, updating, and maintaining user passwords. Particular security parameters associated with user passwords may include parameters regarding acceptable lengths of user IDs and passwords, password duration, password reuse, number of times an invalid password may be entered, number of special characters required in passwords, number of consecutively reoccurring characters permitted in passwords, association of passwords to user ID, and other similar security parameters.

One particular aspect of database security relates to auditing administrative privileges and the security parameters associated therewith. Administrative privileges may include any number of features, including who may access data, which data may be accessed, who may create user IDs and assign privileges thereto, and similar privileges associated with operations which may be performed by a user once access to a database 22-28 is granted.

One non-limiting aspect of the present invention relates to auditing one or more of the databases 22-28 for security compliance. In more detail, the auditing generally relates to querying the security parameters of one or more of the databases 22-28 and auditing the queried security parameters to determine compliance with authorized security parameters. For example, one authorized security parameter may require user password validity to correspond with 60 days whereby the databases 22-28 may be queried for user password validity duration to determine whether the database security parameters are in compliance with the authorized security parameters, i.e. whether that database user password validity duration meets or exceeds the authorized 60 days.

In accordance with one non-limiting aspect of the present invention, the querying signals are emitted from the central security server 14 to one or more of the databases 22-28. In this manner, the signals are transmitted from a centralized location. Moreover, the signals may be transmitted in batch to any number of the databases 22-28 so as to query data from multiple databases from a centralized location and without requiring a user to individually select each database 22-28 for auditing.

In accordance with one non-limiting aspect of the present invention, the queried data may be stored on the central security server 14 along with the authorized security parameters so as to provide a centralized data location. The information may be stored according to any number of formats and protocols, including Extensible Markup Language (XML) and the like. In particular, XML and other similar formats may be advantageous to facilitate customization and manipulation of the information by the central security server 14 and the querying of the information by remote systems.

In accordance with one non-limiting aspect of the present invention, an online server 32 may be provided to communicate with the central security server 14. The online server 32 may include any number of applications and processes for accessing the information stored on the central security server 14 and compiling or otherwise manipulating it for output in security reports. In particular, the online server 32 may be configured to convert XML information stored on the central security server to HyperText Markup Language (HTML) for viewing by a system operator or other security personnel.

In accordance with one non-limiting aspect, the online server 32 may include a graphical user interface (GUI) or other feature to facilitate system operator interaction with the central security server 14. The GUI may include menus and other information for selecting desired security parameters for auditing. For example, the online server 32 may be used to input security parameters to the central security server 14 whereby the central security server 14 audits the databases 22-28 for compliance with the associated security parameters. In this manner, a system operator may direct auditing of one or more of the database 22-28 from a centralized location.

In accordance with one non-limiting aspect of the present invention, the online server 32 may include predefined audit surveys. The audit surveys may include a number of security parameters associated with a particular type of audit survey. For example, the system operator may select a password audit survey to audit user password security parameters of the databases 22-28 for compliance with authorized user password security parameters. Preferably, the authorized security parameters are previously defined, however, the present invention also contemplates capabilities for the system operator to input or select the authorized security parameters.

In accordance with one non-limiting aspect of the present invention, the databases 22-28 may be queried by the central security server 14 in response to requests from the online server 32 and/or in response to automated auditing functions, such as time dependent triggers (day, month, time from last audit, etc.), user triggers (upon registration, change of ID, change of password, etc.), and the like. The automated auditing may be advantageous to collecting data in advance of anticipated requests from the online server 32.

In accordance with one non-limiting aspect of the present invention, the queries may be executed in batch operations wherein query signals are transmitted from the central security server 14 to automatically query multiple databases. For example, one aspect of the present invention contemplates executing the batches in a mechanically-scheduled batch job whereby a list of databases 22-28 are contacted for security review and evaluated one after the other, and the results are stored in the database 14 for viewing the next day (or any subsequent day, as long as the data is retained). The batches may be specified through the online server 32, such as by geographical area, systems or data type, and other characteristics associated with the database that may be used to differentiate the databases 22-28 from each other. Furthermore, the batch operation may include querying the databases for the same or different security parameters.

In accordance with one non-limiting aspect of the present invention, the central security server 14 may process the queried data against the authorized data to determine compliance. For example, the central security server 14 may be configured to continuously track the compliance of each database with respect to the authorized security parameters associated therewith. In this manner, the central security server 14 may include a master copy of authorized security parameters against queried database security parameters with an indication of whether the database are in compliance with each security parameter.

The raw data may then be queried by the online server 32 for use in compiling security reports. In particular, the online server 32 may request the central security server 14 to query the databases for specific security parameters whereby the central security server audits the queried data for compliance and stores the data related thereto for querying and compiling by the online server 32. Of course, the present invention contemplates any number of configurations for the central security server 14 and the online server 32 and is not intended to be limited to the foregoing.

As described above, the present invention may provide audit compliance to company security policies by auditing databases 22-28 associated therewith for compliance with authorized security parameters. The present invention may be applied to relational databases such that security compliance enforcement may be centralized, universal, manageable, customizable as requirements change, and compliance results stored, current, timely, and available for reporting as needed.

The present invention is advantageous for any number of reasons, including to ability to look at security within the databases 22-28, as opposed to pushing security to the databases for self-execution and implementation. Moreover, the ability to execute batch operations is also advantageous as it eliminates the need for an operator to point at a database, click, and process the report. In particular, the present invention is able to run the analysis from a central location, in batch, against multiple databases and store the data as XML in the central security server 14 that XML may then be processed via XSL into HTML at the online server or other website for a system database administrator (DBA) or other to review. In this manner, management can view reports to observe overall security compliance and use their influence over DBAs to force security compliance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of auditing databases for security compliance, the method comprising:

querying databases in batch operation with signals emitted from a remotely located central security server for database security parameters associated with the databases such that the databases are queried without being individually selected by a user to be queried, wherein the database security parameters associated with each database define rules for user identifications and user passwords to be used by users to access the database, wherein the databases are queried for different database security parameters such that the queried database security parameters associated with at least one of the databases is different than the queried database security parameters associated with at least one of the other databases;

wherein querying databases further includes automatically querying a database with a signal emitted from the central security server for database security parameters associated with the database in response to a user changing at least one of the user identification and the user password used by the user to access the database;

determining authorized database security parameters for each queried database security parameter;

for each database, auditing at the central security server the queried database security parameters associated with the database for compliance with the authorized security parameters;

for each database, determining each queried database security parameter associated with the database as being a noncompliant security parameter if the queried database security parameter associated with the database fails to comply with the authorized database security parameters; and compiling a security report of databases having noncompliant security parameters.

2. The method of claim 1 further comprising compiling the security report at an online server.

3. The method of claim 2 further comprising providing a menu accessible through the online server for determining the database security parameters for auditing.

4. The method of claim 3 further comprising providing a number of predefined audit surveys, each audit survey specifying a number of database security parameters for auditing.

5. The method of claim 1 further comprising querying databases for database security parameters determined as a function of a predefined audit survey.

6. The method of claim 5 wherein the audit survey relates to a user password audit such that the databases are queried for database security parameters related to user password security, and wherein the method further comprises auditing the queried user password security parameters for compliance with authorized user password security parameters.

7. The method of claim 5 wherein the audit survey relates an administrative audit such that the databases are queried for database security parameters related to database administration, and wherein the method further comprises auditing the queried administrative security parameters for compliance with authorized administrative security parameters.

8. The method of claim 1 further comprising storing the security report on the central security server according to Extensible Markup Language (XML).

9. The method of claim 8 further comprising accessing the security report stored on the central security server from an online server located remotely from the central security server, wherein the online server converts the XML security report to HyperText Markup Language (HTML) for viewing.

10. A system for auditing databases for security compliance, the system comprising:

a central security server in communication with remotely located databases and configured for querying the databases in batch operation with signals for database security parameters associated with the databases such that the databases are queried without being individually selected by a user to be queried, wherein the database security parameters associated with each database define rules for user identifications and user passwords to be used by users to access the database, wherein the central security server queries the databases for different database security parameters such that the queried database security parameters associated with at least one of the databases is different than the queried database security parameters associated with at least one of the other databases, the central security server further configured for automatically querying a database with a signal for database security parameters associated with the database in response to a user changing at least one of the user identification and the user password used by the user to access the database, auditing for each database the queried database security parameters associated with the database for compliance with authorized security parameters associated therewith, and determining for each database each queried database security parameter associated with the database as being a noncompliant security parameter if the queried database security parameter associated with the database fails to comply with the authorized security parameters; and an online server in communication with the central security server and configured for compiling a security report of databases having noncompliant security parameters.

11. The system of claim 10 wherein the databases are relational databases.

* * * * *